March 18, 1924.

C. C. FARMER

LOAD BRAKE DEVICE

Filed Feb. 23, 1923

1,486,872

INVENTOR
CLYDE C. FARMER
BY Wm. M. Cady
ATTORNEY

Patented Mar. 18, 1924.

1,486,872

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD-BRAKE DEVICE.

Application filed February 23, 1923. Serial No. 620,796.

*To all whom it may concern:*

Be it known that I, CLYDE C. FARMER, a citizen of the United States, residing at Pittsburgh, in the county of Allegheny and State of Pennsylvania, have invented new and useful Improvements in Load-Brake Devices, of which the following is a specification.

This invention relates to an empty and load brake equipment adapted more particularly for single car electric traction service, where the brakes are controlled by straight air.

The principal object of my invention is to provide an improved empty and load brake equipment having means for adjusting the pressure of fluid under pressure for braking purposes according as the car is empty or loaded.

Figure 1:
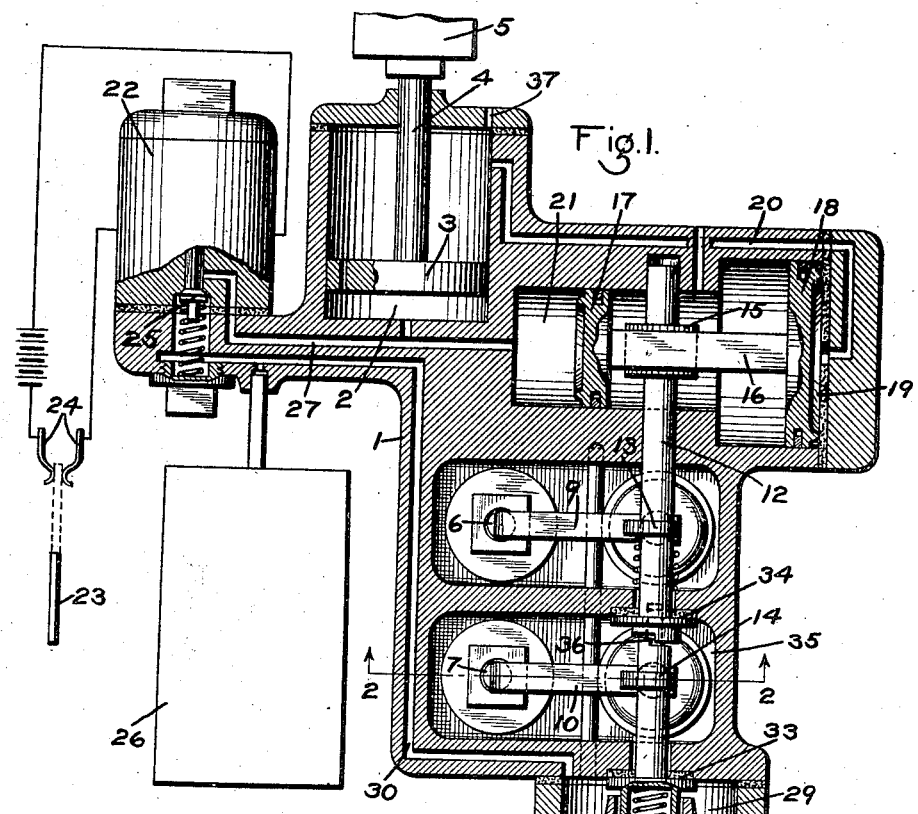

In the accompanying drawing; Fig. 1 is a diagrammatic sectional view of an empty and load brake equipment embodying my invention; and Fig. 2 a section on the line 2—2 of Fig. 1.

As shown in the drawing, a casing 1 is provided which may be mounted at a suitable point on the car truck bolster, said casing having a piston chamber 2 containing a piston 3. The piston 3 is provided with a stem 4 adapted to engage a portion 5 of the car body, so that the position of the piston is determined by the position of the car body relative to the car truck according as the car is empty or loaded.

Where straight air brakes are employed fluid under pressure is supplied directly from a main reservoir, by manipulation of a brake valve device, to the brake cylinder and consequently the maximum brake cylinder pressure obtainable is determined by the maximum pressure which is maintained in the main reservoir.

In order to provide a braking pressure to correspond with the empty or loaded condition of the car I provide means for adjusting the pump governor which regulates the main reservoir pressure so that when the car is loaded a higher main reservoir pressure is provided than when the car is empty.

The pump governor may be of the type such as shown in Patent No. 1,169,305 of W. V. Turner, dated January 25, 1916, in which an electric switch is provided for controlling the circuit of the electric motor which drives the fluid compressor and a piston for operating said switch. For controlling the admission and release of fluid under pressure to and from the switch piston, a cut-in portion is provided which is adapted to release fluid from the switch piston so as to permit the closing of the pump motor circuit when the main reservoir pressure becomes reduced to a predetermined degree as determined by an adjustable regulating spring. A cut-out portion is also provided which is adapted to supply fluid to the switch piston so as to cause the opening of the motor switch when the main reservoir pressure has been raised to a predetermined degree as determined by an adjustable regulating spring.

Figure 2:
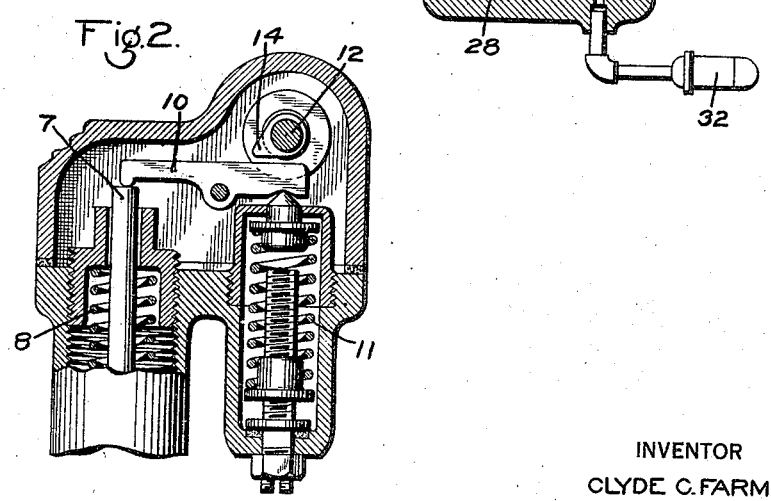

In the drawing it is not deemed necessary to show the pump governor as above described, it being understood that the stems 6 and 7 are associated with cut-in and cut-out portions of an electric pump governor and are subject to the pressure of adjustable regulating springs, the regulating spring 8 of the cut-out portion being shown in Fig. 2.

According to my invention, when the car is loaded, the pressure of an additional spring is imposed on each of the stems 6 and 7 so that the governor will then act to cause the compressor to maintain a higher pressure in the main reservoir.

Pivotally mounted in the casing 1 are levers 9 and 10, the lever 9 having one end engaging the exposed end of the cut-in valve stem 6 and having the other end subject to the pressure of a spring, and the lever 10 having one end engaging the exposed end of the cut-out valve stem 7 and the other end subject to the pressure of a spring 11. As shown in Fig. 2, the cut-out valve stem 7 is subject to the combined pressures of the usual regulating spring 8 and the additional spring 11 and similarly, the cut-in valve stem 6 is subject to the combined pressures of the usual regulating spring and an additional spring, unless the levers 9 and 10 are operated so as to cut out the action of the corresponding additional springs. For this purpose, a shaft 12 is provided, on which are mounted cams 13 and 14, so located as to engage the levers 9 and 10 when the shaft 12 is rotated.

At one end, the shaft 12 is provided with a pinion 15 adapted to mesh with a rack bar 16, said bar forming a connecting member between differential pistons 17 and 18. The larger piston head 18 is contained in a piston chamber 19 having a passage 20 opening at the upper portion of the piston chamber 2 and the other piston head 17 is contained in a piston chamber 21.

In order to prevent operation of the apparatus while the car is running, the fluid pressure for operating the differential piston device is supplied only when the car is standing and the car door is opened and for this purpose an electro-magnet 22 is provided, the circuit of which is closed only when the car door 23 is moved to its open position, as shown in dotted lines in Fig. 1, so as to close the circuit through switch contacts 24. The magnet 22 controls a valve 25 for supplying fluid under pressure from the main reservoir 26 through a passage 27 to piston chamber 2 and also to the piston chamber 21.

When the pump governor is adjusted from the maximum main reservoir pressure setting to the minimum main reservoir pressure setting, the maximum pressure in the main reservoir should be reduced to the minimum pressure and for this purpose a rotary slide valve 28 is provided, which is operatively connected to the shaft 12. The valve chamber 29 containing the rotary valve 28 is connected by a passage 30 with the main reservoir 26 and the rotary valve is provided with a port 31 adapted in the empty position of the parts to connect the valve chamber 29 and consequently the main reservoir 26 with a blow down valve device 32 which is adapted to permit the escape of fluid under pressure until the pressure in the main reservoir has been reduced to the minimum pressure suitable for braking the car when in the empty condition.

In order to prevent leakage from the valve chamber 29 around the shaft 12, a gasket 33 may be associated with the shaft so as to provide a leak proof joint at the opening from said chamber through which the shaft 12 extends. A similar gasket 34 may be provided on the shaft 12 to prevent leakage from the chamber 35. In order to ensure the seating of both gaskets 33 and 34, the shaft 12 may be formed in two sections rotatively interlocked as shown at 36 but adapted to permit relative longitudinal movement of the shaft sections.

In operation, when a car equipped with the empty and load brake apparatus is stopped and the car door 23 is moved to its open position (as shown in dotted lines in Fig. 1), the magnet 22 will be energized and the valve 25 will be opened to admit fluid under pressure from the main reservoir 26 through passage 27 to the piston chamber 2 and also to the piston chamber 21 of the differential piston device. If the car is loaded while thus stopped, the car body will be moved so that the portion 5 assumes the relative position as shown in Fig. 1 and the piston 3 will be held in its lower position, in which communication through passage 20 is cut off. Fluid under pressure being supplied through passage 27 to piston chamber 21, the differential piston device will be shifted to the load position, as shown in Fig. 1, the piston chamber 19 being open to the atmosphere through passage 20 and a restricted exhaust port 37. In this position of the differential piston device the shaft 12 is turned by the operation of the pinion 15, so that the covers 13 and 14 do not engage the levers 9 and 10 and consequently the pressure of the additional spring 11 is added to the pressure of the usual regulating spring 8 of the cut-out portion of the pump governor and in the same way the pressure of an additional spring is added to the pressure of the usual regulating spring of the cut-in position of the governor. The pump governor will therefore operate to cause the compressor motor to maintain the compressor in operation until the pressure in the main reservoir has been raised to the maximum degree desired for braking under the loaded condition of the car.

If when the car is brought to a stop and the car door is opened, the car is empty or is relieved of its load, then the car body will move upwardly relative to the car truck, permitting the piston 3 to be moved upwardly by the fluid under pressure supplied to the piston chamber 2 when the magnet 22 is energized, so that piston 3 will be shifted to open communication from the chamber 2 below the piston to passage 20. Fluid under pressure will now be supplied from the main reservoir 26 through piston chamber 2 and passage 20 to piston chamber 19 of the differential piston device and while fluid is also supplied to the piston head 17, since the piston head 18 is of greater area than piston head 17, the differential piston device will be shifted to the left, causing the rack 16 to rotate the pinion 15 and the shaft 12, so that the cams 13 and 14 engage the respective levers 9 and 10. Said levers are then moved out of engagement with the respective valve stems 6 and 7 of the pump governor, so that the pressures of the additional springs are cut out of action and the governor then acts in accordance with the usual regulating springs which are adjusted for the minimum main reservoir pressure desired for braking a car in the empty condition. In this movement of the shaft 12, the valve 28 is rotated, so that the port 31 is moved into registry with the blow down valve device 32, and since the main reservoir 26 is connected to valve chamber 29 through passage 30, the pressure in the main reservoir will be reduced to the minimum degree desired for empty car braking.

It will now be seen that with the above described equipment, when the car is loaded, the pump governor is automatically adjusted so as to maintain a maximum high pressure in the main reservoir suitable for applying the brakes by means of straight air at the desired pressure for a car in the loaded condition, while if the car is in the empty condition the governor is automatically adjusted to provide a lower main reservoir pressure sufficient for braking a car in the empty condition.

Having now described my invention, what I claim as new and desire to secure by Letters Patent, is:—

1. In an empty and load brake apparatus, the combination with a source of fluid under pressure from which fluid is supplied to operate the brakes, of means for maintaining different maximum degrees of pressure in said source according to the empty or loaded condition of the car.

2. In an empty and load brake apparatus, the combination with a reservoir from which fluid under pressure is supplied to effect an application of the brakes, of means for maintaining one maximum degree of pressure in said reservoir when the car is loaded and a lower maximum degree of pressure therein when the car is empty.

3. In an empty and load brake apparatus, the combination with a reservoir from which fluid under pressure is supplied to effect an application of the brakes, of a pump governor operative to impose a predetermined maximum degree of pressure of fluid in said reservoir when the car is loaded and means operative when the car is light to adjust said governor to impose a lower predetermined maximum degree of pressure in said reservoir.

4. In an empty and load brake apparatus, the combination with a reservoir from which fluid under pressure is supplied to effect an application of the brakes, of a pump governor operative to maintain a predetermined maximum degree of pressure in said reservoir, means for adjusting said governor to maintain a higher maximum degree of pressure in said reservoir, and mechanism operative when the car is empty for cutting said means out of action.

5. In an empty and load brake apparatus, the combination with a pump governor including a regulating spring and a device subject to the pressure of said spring for controlling the pump pressure, of an additional spring, means for imposing the pressure of said additional spring on said device, and mechanism operative when the car is empty for preventing said means from imposing the pressure of said additional spring on said device.

6. In an empty and load brake apparatus, the combination with a pump governor for determining the maximum pump pressure and including a cut-in and a cut-out portion each provided with a regulating spring, of an additional spring associated with such portion, a lever for transmitting the pressure of each additional spring to the corresponding portion, and means actuated when the car is empty for operating said levers to cut out the action of said additional spring.

7. In an empty and load brake apparatus, the combination with a reservoir from which fluid under pressure is supplied to effect an application of the brakes and mechanism adjustable to maintain different maximum degrees of fluid pressure in said reservoir, of means for adjusting said mechanism, a differential piston device for operating said means, and a valve device operated according to the load on the car for controlling the fluid pressure on said differential piston.

8. In an empty and load brake apparatus, the combination with a reservoir from which fluid is supplied to effect an application of the brakes, of a differential piston device, means operated by said piston device for varying the maximum degree of fluid pressure carried in said reservoir, a piston device operated according to the load on the car for varying the fluid pressure on said differential piston device, and means controlled by the opening and closing of a car door for controlling the supply of fluid under pressure for operating said differential piston device.

9. In an empty and load brake apparatus, the combination with a reservoir from which fluid is supplied to effect an application of the brakes, of means operable upon loading the car for maintaining a predetermined maximum degree of pressure in said reservoir and upon unloading the car for maintaining a lower predetermined maximum degree of pressure in said reservoir, and means operable when the car is unloaded for reducing the pressure in said reservoir to the maximum degree established for empty car braking.

In testimony whereof I have hereunto set my hand.

CLYDE C. FARMER.